United States Patent [19]
Ito et al.

[11] Patent Number: 5,386,415
[45] Date of Patent: Jan. 31, 1995

[54] PACKET COMMUNICTION METHOD AND PACKET COMMUNICATION APPARATUS

[75] Inventors: Yutaka Ito, Yokohama; Makoto Mori, Hiratsuka; Shinobu Gohara, Yokohama, all of Japan

[73] Assignee: Hitachi, Ltd., Tokyo, Japan

[21] Appl. No.: 789,001

[22] Filed: Nov. 7, 1991

[30] Foreign Application Priority Data

Nov. 9, 1990 [JP] Japan .................... 2-302371

[51] Int. Cl.$^6$ .......................................... H04Q 11/04
[52] U.S. Cl. ...................................... 370/60; 370/94.1
[58] Field of Search .................. 370/54, 60, 60.1, 61, 370/85.1, 85.4, 85.5, 85.9, 85.12, 85.15, 94.1, 99; 340/825.05

[56] References Cited
U.S. PATENT DOCUMENTS

| | | | |
|---|---|---|---|
| 4,603,416 | 7/1986 | Servel et al. | 370/94.1 |
| 4,755,986 | 7/1988 | Hirata | 370/94.1 |
| 4,768,190 | 8/1988 | Giancarlo | 370/85.15 |
| 4,809,267 | 2/1989 | Higuchi et al. | 370/85.15 |
| 4,815,071 | 3/1989 | Shimizu | 370/60 |
| 4,837,761 | 6/1989 | Isono et al. | 370/60 |
| 4,910,731 | 3/1990 | Sakurai et al. | 370/60 |
| 4,930,122 | 5/1990 | Takahashi et al. | 370/85.15 |
| 4,956,839 | 9/1990 | Torii et al. | 370/94.1 |
| 5,099,475 | 3/1992 | Kozaki et al. | 370/60 |
| 5,101,404 | 3/1992 | Kunimoto et al. | 370/60 |
| 5,113,392 | 5/1992 | Takiyasu et al. | 370/94.1 |
| 5,121,384 | 6/1992 | Ozeki et al. | 370/85.15 |

OTHER PUBLICATIONS

"Statistical Multiplexing Effects and Traffic Control Parameters in an ATM Network", Noguchi et al., IEICE Trans., vol. J73B, No. 1, pp. 25–33, Jan. 1990.
"A Memory Switch Architecture for ATM Switching Network", Endo et al., IEICE Technical Report, SSE88-56, pp. 37–42, Jul. 1988.

*Primary Examiner*—Douglas W. Olms
*Assistant Examiner*—Alpus H. Hsu
*Attorney, Agent, or Firm*—Antonelli, Terry, Stout & Kraus

[57] ABSTRACT

In communication nodes inserted in a ring-shaped or bus-shaped transmission path, a transmitting section writes transmission packets into transmission buffers in appropriate order and sends out the transmission packets onto the transmission path at appropriate unoccupied time of the transmission path, whereas a receiving section temporarily stores packets directed to its own node into a receiving buffer and reads out the packets in the same order as that of writing them into the transmission buffers in the transmitting section. Further, in the transmitting section, special packets referred to as "restart cells" are inserted on all of the transmission paths or written into all transmitting buffers at intervals of a fixed period. In the receiving section, when the restart cell is received on a certain transmission path, readout of packets arriving at that transmission path is temporarily stopped. After restart cells have arrived at all transmission paths, readout is reopened from the first transmission path of the order.

10 Claims, 7 Drawing Sheets

FIG. 5
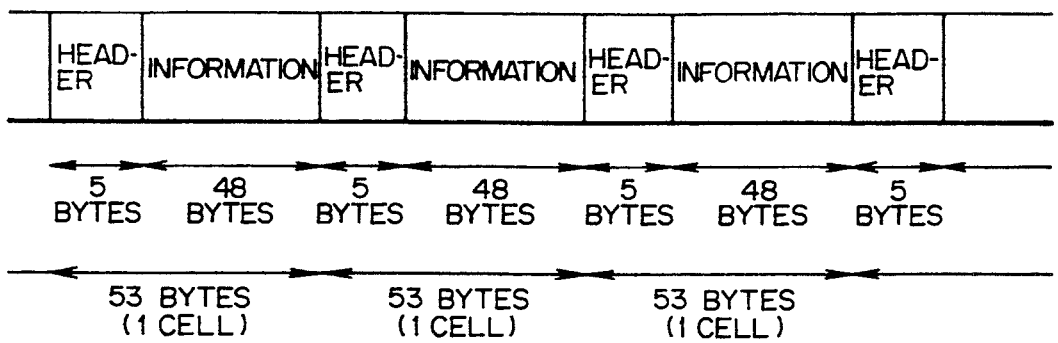
FIG. 6
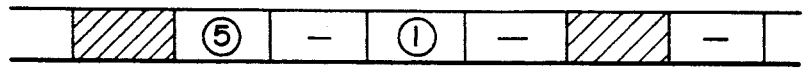
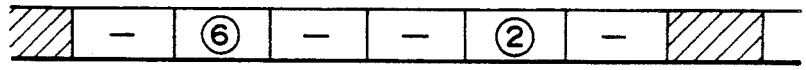
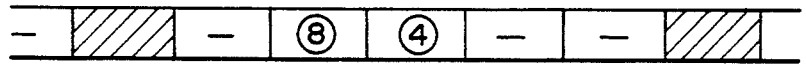

FIG. 7

| | TRANSMISSION PATH TO BE READ SUBSEQUENTLY | RESTART CELL ARRIVING TRANSMISSION PATH | | | | TIME |
|---|---|---|---|---|---|---|
| | | TRANS-MISSION PATH $l_1$ | TRANS-MISSION PATH $l_2$ | TRANS-MISSION PATH $l_3$ | TRANS-MISSION PATH $l_4$ | |
| NODE 1 OF TRANSMISSION SOURCE | 2 | — | — | — | — | |
| NODE 2 OF TRANSMISSION SOURCE | 1 | ○ | — | ○ | — | |

FIG. 8

| | TRANSMISSION PATH TO BE READ SUBSEQUENTLY | THE NUMBER OF PACKETS STORED IN COMMON BUFFER | | | | RESTART CELL ARRIVING TRANSMISSION PATH | | | | TIME |
|---|---|---|---|---|---|---|---|---|---|---|
| | | TRANS-MISSION PATH $l_1$ | TRANS-MISSION PATH $l_2$ | TRANS-MISSION PATH $l_3$ | TRANS-MISSION PATH $l_4$ | TRANS-MISSION PATH $l_1$ | TRANS-MISSION PATH $l_2$ | TRANS-MISSION PATH $l_3$ | TRANS-MISSION PATH $l_4$ | |
| NODE 1 OF TRANSMISSION SOURCE | 2 | 0 | 0 | 2 | — | — | — | — | — | |
| NODE 2 OF TRANSMISSION SOURCE | 3 | 1 | 0 | 0 | — | — | ○ | — | — | |

PACKET COMMUNICTION METHOD AND PACKET COMMUNICATION APPARATUS

BACKGROUND OF THE INVENTION

The present invention relates to a packet communication system in which voice information, picture information, high-speed data information or the like is communicated in the form of packets, and in particular to a transmission method and apparatus for transmitting the above described information. Especially the present invention relates to a packet communication method and apparatus suitable for packet transmission in which the above described information or the like is transmitted as packets in an asynchronous transfer mode (ATM).

In the field of communication, the ATM method recently attracts attention as a transmission technique capable of handling traffics ranging from a low speed to a high speed in a one-dimensional manner. In the ATM method, various kinds of information is converted into a packet form and transmitted in an asynchronous transfer mode as described above. All information transmitted from a user inclusive of signals is divided into short, fixed-length packets referred to as cells. Fixed-length cells are suitable for higher speed and parallel processing. Each cell includes a header portion having a capacity of several bytes and an information portion having a capacity of several tens to several hundreds bytes which will be described later. The header portion has therein a logical channel number for identifying the destination of transmission (transmission destination communication node: packet communication apparatus) or the call (transmission source subscriber terminal) and an error check code for detecting a header error, for example.

In such an ATM method, all information is handled with fixed-length cells in a unified manner and an arbitrary speed including a variable speed can be coped with. Therefore, the ATM method can cope flexibly with uncertain diverse demand and cope with communication of various media ranging from a low-speed medium to a high-speed medium. That is to say, the ATM method also has a possibility of a multi-media integrated network.

Further, an apparatus in which cells are transmitted does not have slots fixed to respective calls. Therefore, cells can be transmitted to arbitrary positions, resulting in efficient multiplexing.

This multiplexing effect is exhibited in a paper written by Noguchi etc. ("A method for prescribing the statistical multiplexing effect and burst traffic in ATM switching network", IEICE Trans., Vol. J73B, No. 1, PP. 25–33, January 1990). FIG. 3 (P. 27) of this paper shows characteristic curves of the maximum multiplexing factor Nmax capable of satisfying the quality standards condition of the peak value (maximum value) of the information generation speed with respect to the transmission path capacity ratio Rm. It is indicated that a large multiplexing effect is obtained in a region where the maximum speed per call (peak value of information generation speed) is smaller than the transmission path capacity.

If the maximum speed per call approaches the transmission path capacity, i.e., in a region where the maximum speed is larger than the transmission path capacity, however, the multiplexing effect is lowered, resulting in a problem.

In the prior art, no attention is paid to this point.

SUMMARY OF THE INVENTION

In view of the above described point, the present invention has been made. An object of the present invention is to provide a packet communication method and apparatus capable of having an increased multiplexing effect of transmission path with respect to the maximum speed of calls.

Another object of the present invention is to provide a packet communication method and apparatus which can be applied to a packet communication system having a plurality of communication nodes disposed in a ring-shaped or bus-shaped transmission path, which has a significant multiplexing effect, and which can reduce transmission delay.

Still another object of the present invention is to provide a packet communication method and apparatus which reduces the quantity of hardware and which can be applied to a large-scale communication system.

In accordance with the present invention, the above described objects are achieved by coupling a transmitting section and a receiving section together via a transmission path including a plurality of physical lines and logical lines or a plurality of physical lines or logical lines, sending out transmission packets (cells), which are fed from a user, in a predetermined order from the transmitting section onto the above described transmission path, receiving and temporarily holding the above described packets in the receiving section, and taking out the above described received packets in the same order as the order of their transmission from the transmission section.

Further, in accordance with the present invention, the above described objects are achieved, in a communication system having a plurality of communication nodes inserted in a ring-shaped or bus-shaped transmission path to communicate transmission packets fed from the user between communication nodes, by providing a transmitting section and a receiving section in each of the above described communication nodes, coupling the above described transmitting section and the above described receiving section via a transmission path including a plurality of physical lines and logical lines or a plurality of physical lines or logical lines, writing in the above described transmitting section transmission packets into transmitting buffers in appropriate order, sending out the above described transmission packets thus written onto the above described transmission path at its appropriate unoccupied time, writing (storing) in the receiving section packets directed to its own node temporarily into a receiving buffer, and reading out the packets thus written in the same order as the order of writing them into the above described transmitting buffers in the above described transmitting section.

Further, in accordance with the present invention, the above described transmitting section has an additional configuration for inserting restart cells in every transmission path or writing restart cells into the transmitting buffers at intervals of a predetermined period, whereas the above described receiving section has such an additional configuration that, when the above described restart cell is present in any of the transmission paths, the readout of transmission cells arriving at that transmission path is temporarily stopped and readout from transmission paths is reopened in a predetermined readout order after restart cells have arrived at all of the transmission paths.

Further, in accordance with the present invention, the apparatus is so configured as to use a memory of common buffer type as the above described receiving buffer, form an address chain every transmitting section and every receiving transmission path, store received packets into the above described memory of common buffer type, and perform management of the received packets every transmitting section and every receiving transmission path.

Further, in accordance with the present invention, the above described transmitting section is so configured as to include a plurality of transmitting buffers for writing transmission packets therein and a plurality of write control circuits for controlling the transmitting buffers, and the above described receiving section is so configured as to include a plurality of receiving buffers, read control circuits for controlling the receiving buffers, and ATM switch means for distributing packets arriving from a plurality of transmission paths to the above described plurality of control circuits.

In the packet communication method according to the present invention, the transmission/reception operation is performed in the transmitting section and the receiving section in the same order and hence the order of packets is not disturbed. By using a plurality of transmission paths, therefore, one transmission path equivalently having a large capacity can be realized.

Even if the order of packets arriving at the receiving section is interchanged due to variation of delay in the transmitting buffer or on the transmission path, a wrong order is prevented by keeping early arriving packets waiting in the receiving buffer because packets are read in the same order.

Further, in order to prevent the order of packets becoming continuously wrong in case a packet on a certain transmission path has been missed because of an error on the transmission path or the like, the order is periodically checked by using "restart" cells which are special cells. If the order should be wrong, the order readjustment is performed.

Further, received packets are managed every transmitting section by forming the receiving buffer in the receiving section as a memory of common buffer type. It is thus avoided that a packet fed from another node of transmission source cannot be read out in case a packet fed from a certain node of transmission source cannot be read out. As a result, reduction of the quantity of buffers and reduction of transmission delay time become possible.

Further, separate write and read control using a plurality of write control circuits in the transmitting section and a plurality of receiving buffers in the receiving section facilitates coping with expansion of the apparatus scale.

BRIEF DESCRIPTION OF THE DRAWING

FIGS. 5 and 6 are diagrams illustrating the operation of FIG. 2;

FIG. 7 is a diagram showing storage contents of a state management memory shown in FIG. 3;

FIG. 8 is a diagram showing storage contents of a state management memory shown in FIG. 4.

DESCRIPTION OF THE PREFERRED EMBODIMENTS

Embodiments of the present invention will hereafter be described by referring to FIGS. 1 to 9.

Figure 1:
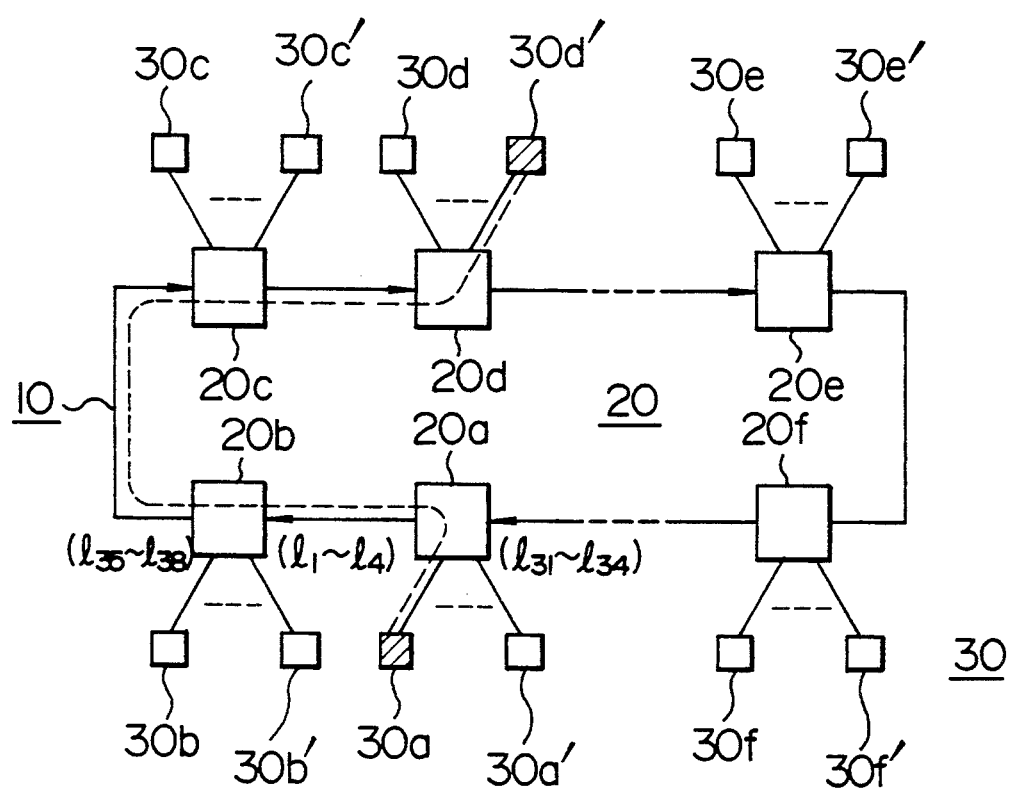
FIG. 1 is a diagram illustrating the application of the present invention.

FIG. 1 is a diagram illustrating an embodiment of the present invention. FIG. 1 is a block diagram showing a packet communication system. A plurality of communication nodes 20 (20a–20f) are inserted in a ring-shaped or bus shaped transmission path 10. A plurality of subscriber terminals (such as telephone, facsimile, videotex, video conference, video telephone, and video terminals) 30 (30a, 30a'–30f, 30f') are connected to each communication node 20. Communication is performed between subscriber terminals via communication nodes and the common transmission path. A route indicated by a broken line in FIG. 1 represents the route of communication between the subscriber terminal 30a and the subscriber terminal 30d'. In this case, the subscriber terminal 30a is functioning as the transmitting side and the subscriber terminal 30d' is functioning as the receiving side.

Figure 2:
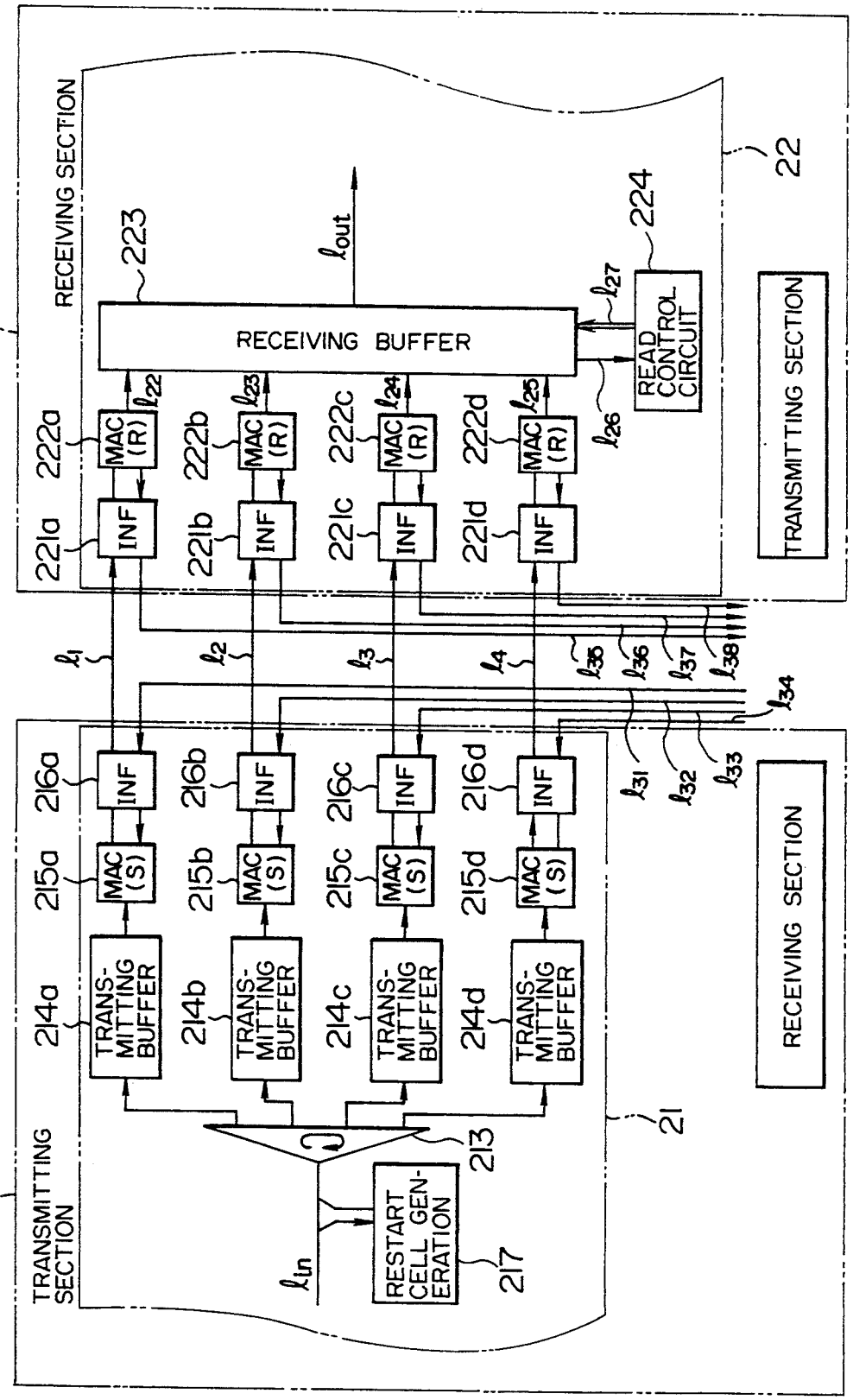
FIG. 2 is a block diagram showing an embodiment of the present invention.

FIG. 2 shows an embodiment in which a packet communication method according to the present invention has been applied to the communication nodes 20 of FIG. 1. FIG. 2 is a block diagram showing an example of a part (20a, 20b) of the communication nodes 20. In FIG. 2, each of the communication nodes 20 (20a, 20b) has a transmitting section 21 and a receiving section 22. The transmitting section 21 and the receiving section 22 of the communication node 20a and the transmitting section 21 and the receiving section 22 of the communication node 20b are coupled by a plurality of transmission paths 10 (four transmission paths are illustrated), i.e., transmission paths including a plurality of physical and logical lines or a plurality of physical lines or logical lines.

By taking the case where the communication node 20a is a communication node of the transmitting side and the communication node 20b is a communication node of the receiving side, a packet communication method according to the present invention will hereafter be described by referring to FIG. 2. The transmitting section 21 of the communication node 20a includes a write control circuit 213 for distributing in parallel packets in serial coming from an input transmission path line and restart cells fed from a restart cell generation circuit described later among a plurality of transmission paths in predetermined order every communication node of transmission destination, transmitting buffers 214 (214a–214d) for writing the above described packets therein and keeping them waiting therein, transmitting control circuits 215 (215a–215d) for determining transmission of transmission packets stored in the transmitting buffers 214 (214a–214d) onto transmission paths $1_1$–$1_4$ (transmitting side) on the basis of packet states of the above described transmitting buffers and incoming transmission paths $1_{31}$–$1_{34}$ (receiving side), a restart cell generation circuit 217 for generating restart cells at intervals of a fixed period and for transmitting the restart cells to the plurality of transmission paths $1_1$–$1_4$ via the above described transmitting buffers, and first interface circuits 216 (216a–216d) for physically interfacing with the ring-shaped transmission paths $1_{31}$–$1_{34}$ and the transmission paths $1_1$–$1_4$.

The receiving section 22 of the communication node 20b includes second interface circuits 221 (221a–221d) for physically interfacing with the transmission paths $1_1$–$1_4$ (receiving side) and ring-shaped outgoing transmission paths $1_{35}$–$1_{38}$ (transmitting side), receiving control circuits 222 (222a–222d) for determining whether a packet transmitted from the transmission path $1_1$–$1_4$ is a received packet directed to its own node, i.e., whether a communication packet fed from the communication node 20a is directed to the communication node 20b, a receiving buffer 223 for temporarily storing received packets directed to its own node, and a read control circuit 224 for so exercising control over operation of reading out the received packets from the above described receiving buffer 223 as to ensure the order of transmission. Each of the above described transmitting control circuit 215 and receiving control circuit 222 can be formed by a media access controller (MAC), for example.

Operation of FIG. 2 will hereafter be described.

Packets (cells) supplied from subscriber terminals 30 (30a, 30a') to the input transmission path line are written into the transmitting buffers 214a–214d packet by packet in predetermined order by the write control circuit 213 of the transmitting section 21 of the communication node 20a. This control is exercised by managing the order every node of transmission destination (communication node). The restart cell generation circuit 217 manages the number of transmission packets for each node of transmission destination (communication node), for example. When a predetermined number of packets have been transmitted, the restart cell generation circuit 217 periodically generates restart cells for that node of transmission destination with respect to each of transmitting and receiving lines $1_1$–$1_4$ of the transmission path. The restart cells thus generated are written into the transmitting buffers 214a–214d by the write control circuit 213.

The transmitting control circuits 215a–215d monitor incoming lines $1_{31}$–$1_{34}$ of the ring-shaped transmission path. If a transmission packet is already stored in the transmitting buffer 214a–214d when an unoccupied packet arrives at that transmission path, it is sent out to the line $1_1$–$1_4$ of the transmission path via the first interface circuit 216a–216d.

In case a media access controller (MAC) is used as the transmitting control circuit, however, the controller exercises fairness control or the like in some cases so that respective communication nodes may use the ring-shaped transmission path fairly and the controller does not perform transmission until a favorable time comes, even if an unoccupied packet has arrived.

In the receiving section 22 of the communication node 20b, packets supplied from the lines $1_1$–$1_4$ of the transmission path via the second interface circuits 221a–221d are monitored by the receiving control circuits 222a–222d. If a packet is directed to its own node, that packet is temporarily stored in the receiving buffer 223. Received packets stored in the receiving buffer 223 are read out by the read control circuit 224 in the same order as that of writing them into the transmitting buffers 214a–214d in the transmitting section 21. At this time, packets supplied from transmitting sections of communication nodes (20c, 20d . . . ) other than the transmitting section 21 of the communication node 20a also arrive at the receiving section 22. Therefore, read control is performed by managing the order of readout every node of transmission source (communication node).

Operation of the present embodiment will be described in more detail by referring to FIGS. 5 and 6.

FIG. 5 is a diagram showing the configuration of a packet (cell) used in the present embodiment. As shown in FIG. 5, a packet (cell) includes a header and an information field and has a fixed length (53 bytes). Into the header, an identifier of the node of transmission destination (communication node) or a call identifier of the transmission source (subscriber terminal) is inserted. By discriminating this identifier, reception of each communication node or the like can be decided.

FIG. 6 shows an example of transmission of transmission packets and restart cells on the lines $1_1$–$1_4$ of the transmission path. In the case shown by this example, transmission packets are first written from the transmitting buffer 214a associated with the line $1_1$, and then transmission packets are written from the transmitting buffer 214b associated with the line $1_2$. In this way, writing is performed in a descending order of transmitting buffer. Numerals ①  to ⑧ within packets indicate the order of arrival of packets coming from subscriber terminals of the transmitting side. Further, restart cells are inserted on each of lines $1_1$–$1_4$ every eight cells, for example. As shown in FIG. 6, the order of packets (②, ③, ①, ④, ⑦, ⑧, ⑤, ⑧) sent out from the transmitting section 21 to respective lines $1_1$–$1_4$ does not necessarily coincide with the order of inputting (①, ②, ③, ④, ⑤, ⑥, ⑦, ⑧) because of waiting time for transmission in the transmitting buffers 214a–214d. Therefore, there is a possibility that the order of packets arriving at the receiving section will be interchanged. If received packets are read out from the receiving buffer 223 always in the order of line $1_1$, $1_2$, $1_3$ and $1_4$, however, the order is not interchanged. In case a certain packet cannot be received due to a header error caused by a transmission error or the like, however, packets arriving from that line are read in respectively preceding periods and hence the order continues to be wrong. By periodically inserting restart cells as shown in FIG. 5, therefore, confirmation and readjustment of order can be performed. That is to say, the correct order is restored by reopening the next readout period after restart cells have arrived at respective lines.

Further detailed configuration and operation of the receiving buffer 223 and the read control circuit 224 will now be described by referring two examples of configuration shown in FIGS. 3 and 4.

Figure 3:
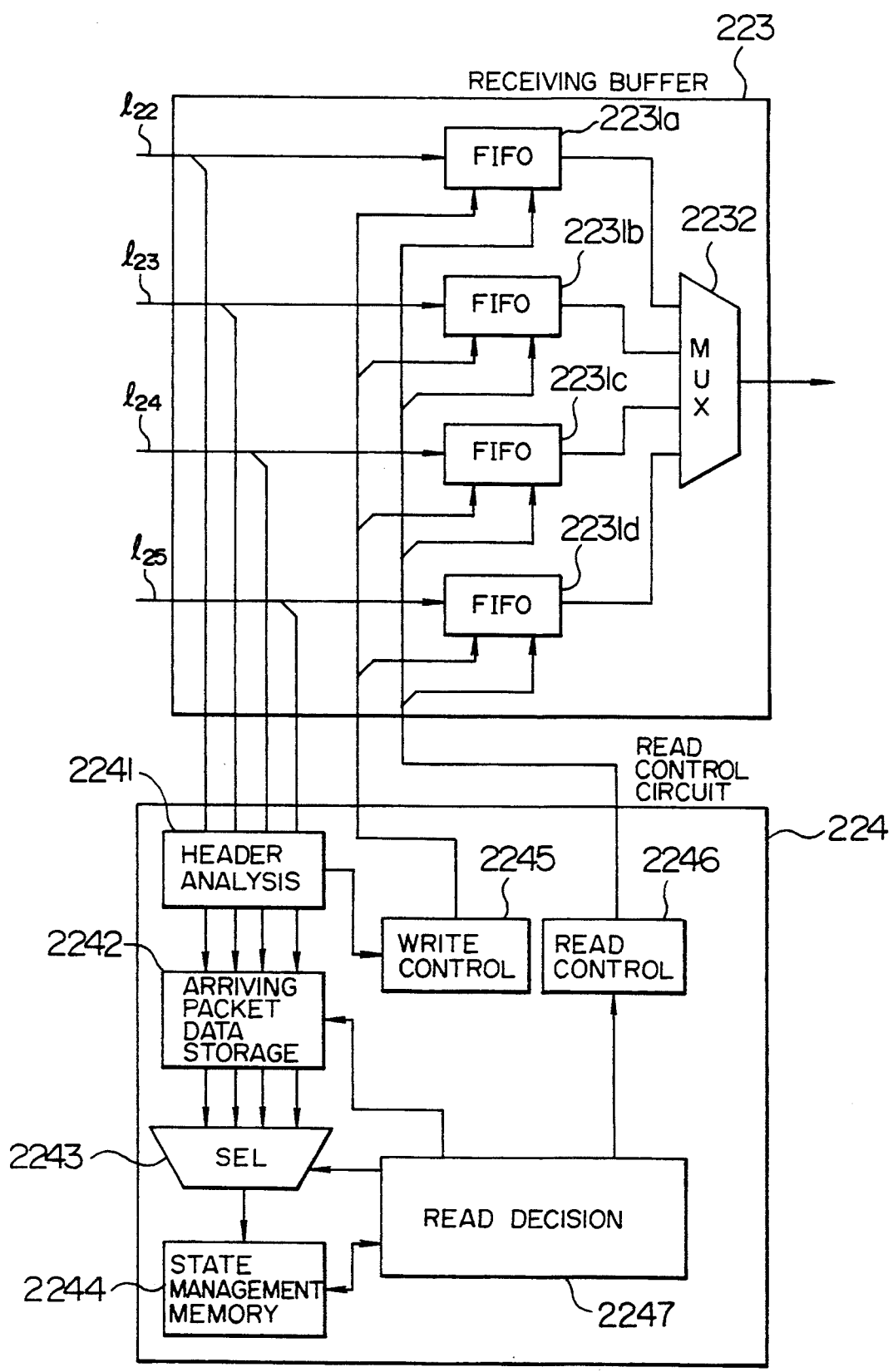
FIG. 3 is a block diagram of a receiving buffer and a read control circuit shown in FIG. 2 in case individual buffers are used.

FIG. 3 shows an example of configuration of the receiving buffer 223 and the read control circuit 224 in case buffers are provided respectively on the lines $1_1$–$1_4$ of the ring-shaped transmission path of the input side.

With reference to FIG. 3, the receiving buffer 223 includes FIFO (first-in first-out) memories 2231a–2231d respectively coupled to output lines $1_{22}$–$1_{25}$ respectively of the receiving control circuits 222a–222d respectively corresponding to the lines $1_1$–$1_4$ of the ring-shaped transmission path. The receiving buffer 223 also includes a multiplexing circuit 2232 for converting parallel cells read out from the FIFO memories 2231a–2231d into serial cells to multiplex them.

The read control circuit 224 includes a header analysis circuit 2241 for analyzing headers of received packets and discriminating the node of transmission source (communication node) and restart cells, an arriving packet data storage circuit 2242 for storing information supplied from the header analysis circuit 2241 in the order of arriving packets, a selector 2243 for switching data supplied from the arriving packet data storage circuit 2242, a state management memory 2244 for storing packet arrival states for every node of transmission source, a read decision circuit 2247 for exercising read decision control over packets written into the FIFO's 2231a-2231d on the basis of information supplied from the state management memory 2244, a memory write control circuit 2245 for exercising write control over the FIFO memories 2231a-2231d, and a memory read control circuit 2246 for exercising control over reading packets from the FIFO memories 2231a-2231d.

Operation of the receiving buffer 223 and the read control circuit 224 shown in FIG. 3 will hereafter be described.

Received packets supplied from the receiving control circuits 222a-222d are written into corresponding FIFO memories 2231a-2231d. However, restart cells are not written but they are discarded here. Header portions of received packets are simultaneously transmitted to the header analysis circuit 2241 to discriminate the nodes of transmission source and restart cells. Results are successively stored into the arriving packet data storage circuit 2242 for each of lines $1_1$-$1_4$. Those data are successively sent to the state management memory 2244 by the selector 2243. Packet arrival states stored for every node of transmission source are sent to the read decision circuit 2247 to determine whether packets can be read out.

FIG. 7 shows contents of data stored in the state management memory 2244. As data, the transmission path number to be read subsequently, the arrival situation of restart cells, and the arrival time (time) of the packet which has arrived lastly are stored for each node of transmission source. As for the node 1 of transmission source, the example of FIG. 7 indicates that a packet which has arrived at the second line $1_2$ should be read out subsequently. It is also indicated that restart cells have not arrived in the current period. As for the node 2 of transmission source, it is indicated that a packet is to be read out from the first line $1_1$. Since a restart cell has already arrived at the first line $1_1$, however, its readout is started after arrival of restart cells at respective lines $1_1$-$1_4$. The arrival time of the packet which has arrived lastly (time) serves as a timer for coping with the loss of a restart cell caused by a transmission error or the like or mutual block of readout performed each other by cells of different transmission sources. If readout operation has stopped for at least a certain predetermined period, read skip is performed.

The decision and processing heretofore described are executed by the read decision circuit 2247. In case a packet has been read out from the FIFO memory 2231a-2231d, data associated with the packet thus read out and stored in the arriving packet data storage circuit 2242 is erased and the line value of the transmission path to be read out subsequently stored in the state management memory 2244 is updated.

Figure 4:
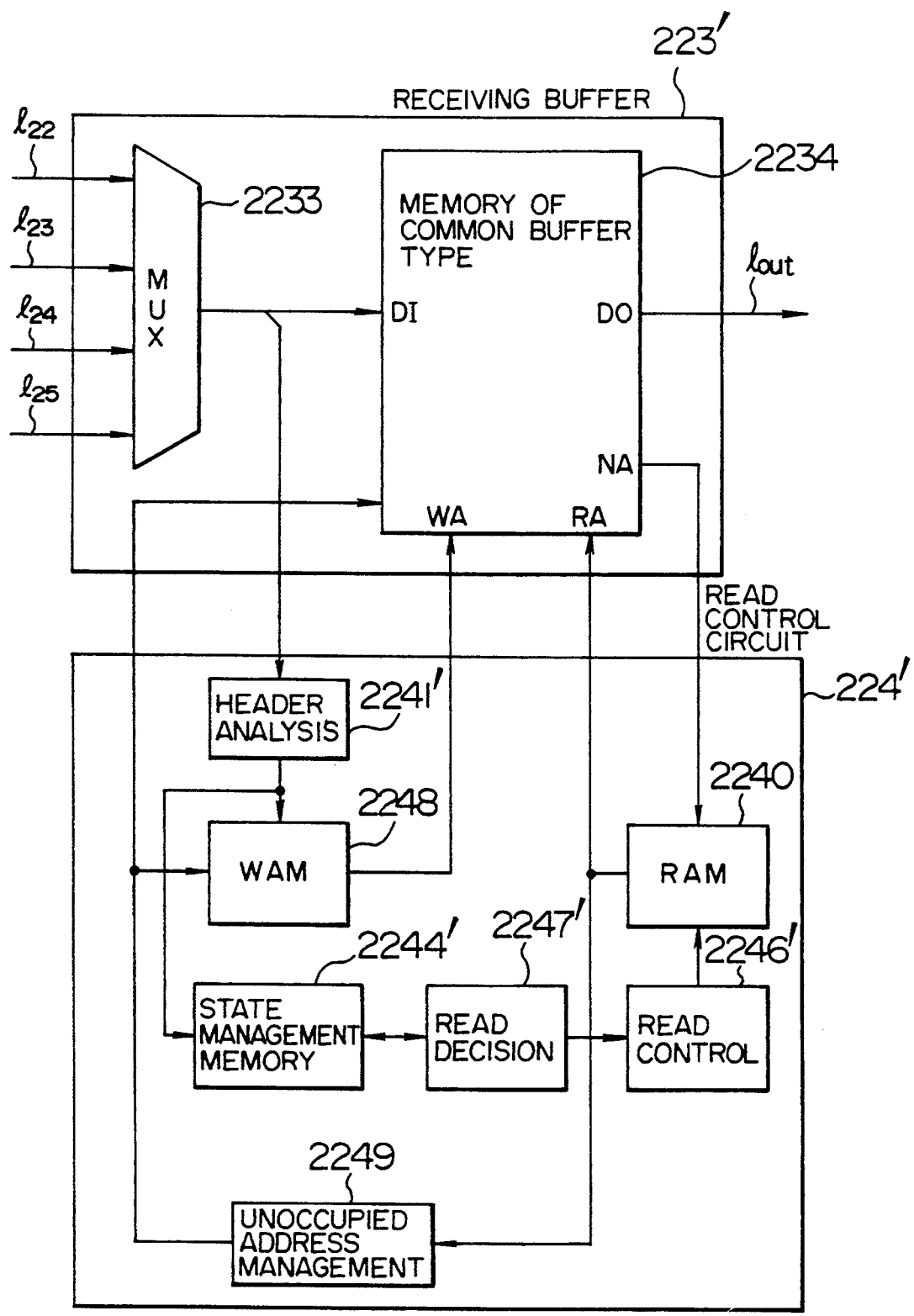
FIG. 4 is a block diagram of the receiving buffer and the read control circuit shown in FIG. 2 in case a memory of common buffer type is used.

FIG. 4 shows an example of configuration of a receiving buffer 223' and a read control circuit 224' in case a memory of common buffer type is used as the receiving buffer.

With reference to FIG. 4, the receiving buffer 223' includes a multiplexing circuit 2233 for converting packets received in parallel from the receiving control circuits 222a-222d of FIG. 2 into a serial form to perform multiplexing and a memory 2234 of common buffer type for forming chains of received packets for every node of transmission source (communication node) and for every line of the input transmission path and for storing the chains.

As this memory of common buffer type, a memory as described in "A proposal of ATM switching architecture", Endo etc., IEICE Technical Report, SSE 88–56, (July 1988) can be used.

The read control circuit 224' includes a header analysis circuit 2241' for analyzing the header of a received packet and discriminating the node of transmission side (communication node) and the restart cell, a write address memory 2248 for storing write addresses, which are used to write the next received packet into the memory 2234 of common buffer type when it arrives, for every node of transmission source (communication node) and for every input transmission path, a state management memory 2244' for managing packet arrival states for every node of transmission source, a read decision circuit 2247' for making a decision on reading a packet from the memory 2234 of common buffer type on the basis of information supplied from the state management memory 2244', a memory read control circuit 2246' for exercising read control over packets in the order of transmission on the basis of information supplied from the read decision circuit 2247', a memory read control circuit 2246' for exercising read control over packets in the order of transmission on the basis of information supplied from the read decision circuit 2247', a read address memory 2240 for storing addresses of packets to be read subsequently for every node of transmission source and for every receiving transmission path, and an unoccupied address management memory 2249 for storing unoccupied addresses of the memory 2234 of common buffer type.

Operation of the receiving buffer 223' and the read control circuit 224' shown in FIG. 4 will hereafter be described.

Received packets supplied from the receiving control circuits 222a-222d shown in FIG. 2 are subjected to parallel-to-serial conversion in the multiplexing circuit 2233. The received packets thus multiplexed are written into the memory 2234 of common buffer type. However, restart cells are not written but they are discarded here. Header portions of received packets are simultaneously transmitted to the header analysis circuit 2241' to discriminate the nodes of transmission source and restart cells in the circuit. Results are stored in the state management memory 2244'. When the above described received packet is written into the memory 2234 of common buffer type, an address to be written subsequently is outputted from the unoccupied address management memory 2249, and the address to be written subsequently is written into the same address in the memory 2234 of common buffer type as that of the received packet. As for the write address memory 2248 as well, an address to be written subsequently is stored and the next packet is written into the location of that address. A received packet and the address of the next packet are stored together in the memory 2234 of common buffer type. When a received packet is read out, therefore, an address to be read subsequently is outputted. The address to be read subsequently is stored in the read address memory 2240, and the next packet is read out in accordance with that address. The address whose packet has been read out is returned to the unoccupied address management memory 2249.

That is to say, in the above described common buffer memory 2234, received packets form an address chain for every node of transmission source and for every input transmission path and each chain functions in the same way as a FIFO (first-in first-out) memory.

Upon arrival of a received packet, the read decision circuit 2247' takes in data concerning the node of transmission source of the received packet from the state management memory 2244' and determines whether readout can be performed. If readout is possible, the read decision circuit 2247' informs the read control section 2246' of nodes of transmission source and input transmission paths of readable packets in the order of readout.

FIG. 8 shows storage contents of the state management memory 2244. For every node of transmission source, there are stored the number of a transmission path (line) to be read subsequently, the number of packets so stored in the common buffer as to correspond to each of lines $1_1$–$1_4$ of the transmission path, the situation of arrival of restart cells on each of lines $1_1$–$1_4$ of the transmission path in the current period, and the arrival time (time) of a packet which has arrived lastly. As for the node 1 of transmission source, the example of FIG. 8 indicates that a packet which has arrived at the second transmission path (line $1_2$) should be read out subsequently. It is also indicated that restart cells have not arrived in the current period. If in this state a packet arrives at the second transmission path (line $1_2$), that packet can be read. In addition, packets have already arrived at the third transmission path (line $1_3$) and the fourth transmission path (line $1_4$) as well. Therefore, these packets can be successively read out in the wake of the above described packet which arrived at the second transmission path.

As for the node 2 of transmission source, it is indicated that a packet which has arrived at the third transmission path (line $1_3$) should be read out subsequently. A restart cell has already arrived at the first transmission path (line $1_1$). If in this state a packet arrives at the third transmission path (line $1_3$), that packet can be read. In addition, a packet has already arrived at the fourth transmission path (line $1_4$) as well. Therefore, that packet can also be read out in succession. As for the packet which has already arrived at the first transmission path (line $1_1$), however, the restart cell already arrived at that transmission path (line $1_1$) and hence it can be read out after restart cells arrive at respective lines $1_1$–$1_4$ of the transmission path. The arrival time of the packet which has arrived lastly (time) serves as a timer for coping with the loss of a restart cell or the like caused by a transmission error or the like. If readout operation has stopped for at least a certain predetermined period, readout is reopened from the next packet or a packet in the beginning of the next period.

The decision and processing heretofore described are executed by the read decision circuit 2247'. Readable packet information contents (node number of transmission source and transmission path number) are sent to the read control circuit 2246' in the order of readout. On the basis of the above described readable packet information, the read control circuit 2246' sends out the node number of transmission source and the transmission path number to the read address memory 2240 every packet period. Thereby the next read address is outputted from the read address memory 2240 and received packets are successively read out from the memory 2234 of common buffer type.

An embodiment in which the present invention is applied to an apparatus having a larger scale will now be described by referring to FIG. 9.

Figure 9:
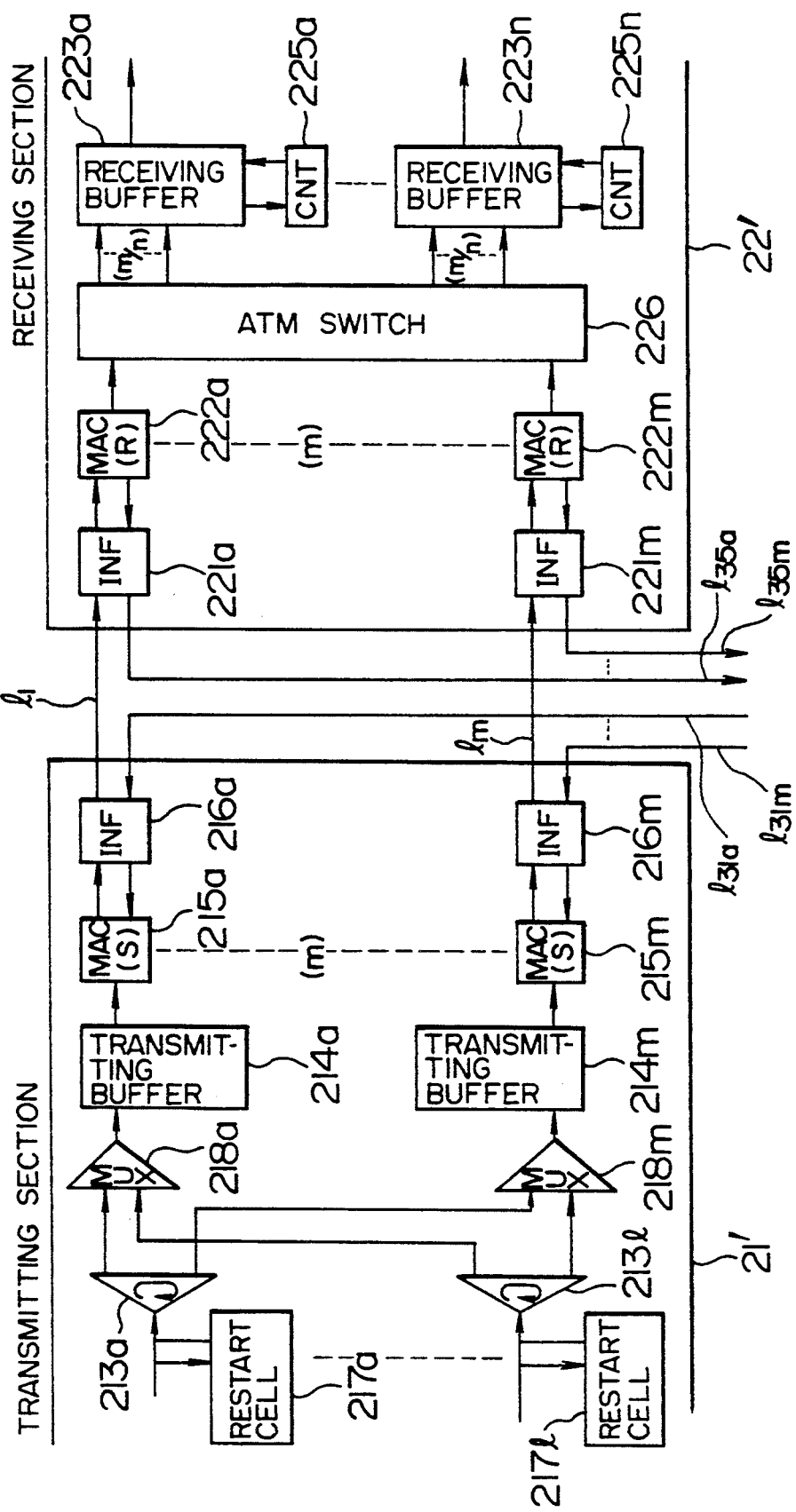
FIG. 9 is a block diagram of an embodiment in which the present invention is applied to a large-scale system.

FIG. 9 shows an example of configuration in case the scale of the embodiment of FIG. 2 is expanded to use m ring-shaped transmission paths. A transmitting section 21' includes restart cell generation circuits $217a$–$217l$, write control circuits $213a$–$213l$, transmission packet multiplexing circuits $218a$–$218m$, transmitting buffers $214a$–$214m$, transmitting control circuits $215a$–$215m$, and first interface circuits $216a$–$216m$. A receiving section 22' includes second interface circuits $221a$–$221m$, receiving control circuits $222a$–$222m$, an ATM packet switch 226 for distributing received packets by taking a certain predetermined number (m/n) of communication nodes of transmission source as the unit, receiving buffers $223a$–$223n$, and read control circuits $225a$–$225n$ associated with the receiving buffers.

In the configuration of the present embodiment, a large number (m) of ring-shaped transmission paths $1_{31a}$–$1_{31m}$, $1_1$–$1_m$, and $1_{35a}$–$1_{35m}$ are used. If the same configuration as FIG. 2 is used, therefore, there is a possibility that the control operation for writing transmission packets into the transmitting buffers $214a$–$214m$ in the transmitting section 21' and the control operation for reading received packets from the receiving buffers in the receiving section 22' will become difficult as regards the processing speed. In the present embodiment, therefore, the write control in the transmitting section 21' and the read operation in the receiving section 22' are performed separately to cope with the problem of processing speed. In the example of FIG. 9, the write control in the transmitting section 21' is exercised by 1 write control circuits $213a$–$213l$ and 1 restart cell generation circuits $217a$–$217l$ associated with the write control circuits, whereas the read control in the receiving section 22' is exercised by n receiving buffers $223a$–$223n$ and n read control circuits $225a$–$225n$ associated with the receiving buffers. In order to perform the write control separately in the transmitting section 21', transmission packet multiplexing circuits for multiplexing packets supplied from the write control circuits $213a$–$213l$ are so provided as to be associated with the transmitting buffers $214a$–$214m$, respectively. Further, in order to perform the read control separately in the receiving section 22', the ATM packet switch 226 for distributing received packets among the receiving buffers $223a$–$223n$ in accordance with the node of transmission source is inserted between the receiving control circuits $222a$–$222m$ and the receiving buffers $223a$–$223n$.

In the present configuration, the write control and the restart cell generation in the transmitting section 21' are performed separately. Therefore, the read control in the receiving section 22' is so performed as to correspond to the write control circuits $213a$–$213l$ included in the transmitting section.

By using the configuration of FIG. 9 described above, expansion to a larger-scale system becomes possible.

Embodiments in which the present invention is applied to ring-shaped transmission paths have heretofore been described. However, the present invention can be further applied to one-to-one communication or communication using a configuration having a plurality of nodes disposed in a bus-shaped transmission path. Further, in the embodiments described above, a plurality of physical transmission paths have been used. However, the number of transmission paths may be reduced by using frequency division multiplex or wavelength multiplex to perform logical multiplexing on a transmission path.

In the embodiments described above, it becomes possible to equivalently form one transmission path having a large capacity by using a plurality of transmission paths, resulting in an enhanced multiplexing effect. Further, if a common buffer memory is used as the receiving buffers in the receiving section, the quantity of memories can be reduced by common use of the memory and the packet transmission delay can be reduced because mutual blocking between packets supplied from different nodes of transmission source can be avoided owing to management of received packets for every node of transmission source. Further, if separate write control and separate read control are exercised respectively in the transmitting section and the receiving section as described before, a large-scale system can be realized.

By using a plurality of physical and logical lines or a plurality of physical or logical lines in accordance with the present invention, a single line having a large capacity (the sum total of a plurality of physical and logical lines or a plurality of physical or logical line capacities) can be equivalently formed and hence the multiplexing effect can be enhanced.

In the embodiments described above, control of transmission of packets to a transmission path and control of reception of packets from a transmission path are independent of a mechanism for exercising control over a plurality of lines such as control of writing packets into a transmitting buffer in the transmitting section and read control in the receiving section. Therefore, independent operation is possible without being conscious of other transmission paths. Its operation and configuration can be made similar to those of a single line.

Further, if a memory of common buffer type is used as the receiving buffers in the receiving section, the quantity of buffers and the packet transmission delay can be reduced.

Further, by separate write control in the transmitting section and separate read control in the receiving section, a large-scale system can be realized.

We claim:

1. A packet communication system for communicating packets each including a header portion and an information portion between nodes, each of said nodes comprising:
   a transmitting section for transmitting packets;
   a receiving section for receiving said packets; and
   a plurality of transmission paths including at least one of physical and logical lines for coupling said transmitting section and said receiving section;
   said transmitting section performing serial-to-parallel conversion on said packets, distributing said packets converted into a parallel form among said plurality of transmission paths in an appropriate order, and transmitting said packets;
   said receiving section receiving packets transmitted through said plurality of transmission paths, said receiving section including means for rearranging said received packets in the same order as that before the distribution of packets among said plurality of transmission paths in said transmitting section based on information included in said header portions of said received packets;
   wherein said transmitting section periodically sends out restart cells for regulating a readout order which is different from that of said packets onto each line of the at least one of the physical and logical lines of said transmission paths; and
   said receiving section receives said restart cells, confirms the order of receiving said received packets, and readjusts that order.

2. A packet communication system including a plurality of communication nodes coupled by a transmission path, packets each including a header portion and an information portion being communicated between said plurality of nodes,
   each of said communication nodes comprising a transmitting section for transmitting said packets and a receiving section for receiving said transmitted packets, said transmitting section and said receiving section being coupled to said transmission path including at least one of physical and logical lines;
   said transmitting section distributing said transmission packets among lines of said transmission path in appropriate order and transmitting said transmission packets thus distributed;
   said receiving section receiving packets transmitted through said at least one of physical and logical lines, said receiving section including means for rearranging said received packets in the same order as the packet distribution order in said transmitting section based on information included in said header portions of said received packets:
   wherein said transmitting section periodically sends out restart cells for regulating a readout order which is different from that of said packets onto each line of said transmission path; and
   said receiving section receives said restart cells, confirms the order of receiving said received packets, and readjusts that order.

3. A packet communication system including a plurality of communication nodes linked by a transmission path, subscriber terminals being coupled to said communication nodes, information supplied from said subscriber terminals being formed into packets each having a header portion and an information portion, said packets being communicated between said plurality of communication nodes, said communication nodes including at least one transmitting and receiving packet communication apparatus for transmitting and receiving a plurality of transmission packets arranged in a serial form, said transmission path including at least one of physical and logical lines, said at least one packet communication apparatus comprising:
   transmitting buffers for storing transmission packets, said transmitting buffers corresponding to respective lines of said transmission path;
   a write control circuit for managing the order of a plurality of transmission packets supplied from said subscriber terminal of transmitting side for every packet communication apparatus of transmission destination of communication node of transmission destination or for every call of subscriber terminal of transmission source and for exercising control so as to write said plurality of transmission packets into said transmitting buffers in appropriate order;
   transmitting control circuits corresponding to said transmitting buffers and transmitting and receiving lines and incoming lines of said transmission path, whereby when an unoccupied packet arrives at one of the incoming lines of said transmission path and transmission packets are already stored in said transmitting buffers, the packets in said transmitting buffers are sent out onto respective transmitting and receiving lines of said transmission path;

receiving control circuits corresponding to respective transmitting and receiving lines of said transmission path, said receiving control circuits monitoring transmission packets sent out onto transmitting and receiving lines and determining the destination of transmission of the transmission packets;

a receiving buffer for temporarily storing packets found by said receiving control circuit to be directed to its own node; and a read control circuit for reading out the received packets stored in said receiving buffer in the same order as the order of writing said received packets into said transmitting buffers and outputting said received packets thus read out onto outputting lines of said transmission path;

wherein said receiving buffer comprises:

a plurality of first-in first-out memories coupled to said lines, and a multiplexing circuit for time-division multiplexing received packets stored in said memories;

wherein said read control circuit comprises:

a header analysis circuit coupled to said lines to analyze header portions of received packets supplied to said lines and discriminate nodes of transmission source and restart cells, an arriving packet data storage circuit for storing information supplied from said header analysis circuit in the order of arriving packets of said received packets, a selector for switching data supplied from said arriving packet data storage circuit, a state management memory for storing a packet arrival state for every node of transmission source, a read decision circuit for exercising read decision control over packets written into said first-in first-out memories on the basis of information supplied from said state management memory, a memory write control circuit for exercising write control over said first-in first-out memories, and a memory read control circuit for exercising memory read control to exercise control over reading packets from said first-in first-out memories in accordance with instructions from said read decision circuit.

4. A packet communication system including a plurality of communication nodes linked by a transmission path, subscriber terminals being coupled to said communication nodes, information supplied from said subscriber terminals being formed into packets each having a header portion and an information portion, said packets being communicated between said plurality of communication nodes, said communication nodes including at least one transmitting and receiving packet communication apparatus for transmitting and receiving a plurality of transmission packets arranged in a serial form, said transmission path including at least one of physical and logical lines, said at least one packet communication apparatus comprising:

transmitting buffers for storing transmission packets, said transmitting buffers corresponding to respective lines of said transmission path;

a write control circuit for managing the order of a plurality of transmission packets supplied from said subscriber terminal of transmitting side for every packet communication apparatus of transmission destination of communication node of transmission destination or for every call of subscriber terminal of transmission source and for exercising control so as to write said plurality of transmission packets into said transmitting buffers in appropriate order;

transmitting control circuits corresponding to said transmitting buffers and transmitting and receiving lines and incoming lines of said transmission path, whereby when an unoccupied packet arrives at one of the incoming lines of said transmission path and transmission packets are already stored in said transmitting buffers, the packets in said transmitting buffers are sent out onto respective transmitting and receiving lines of said transmission path;

receiving control circuits corresponding to respective transmitting and receiving lines of said transmission path, said receiving control circuits monitoring transmission packets sent out onto transmitting and receiving lines and determining the destination of transmission of the transmission packets;

a receiving buffer for temporarily storing packets found by said receiving control circuit to be directed to its own node; and a read control circuit for reading out the received packets stored in said receiving buffer in the same order as the order of writing said received packets into said transmitting buffers and outputting said received packets thus read out onto outputting lines of said transmission path;

wherein said receiving buffer comprises:

a multiplexing circuit coupled to transmitting and receiving lines of said transmission path to perform parallel-to-serial conversion on transmission rackets supplied to said lines and thereby perform multiplexing, and a memory of common buffer type coupled to said multiplexing circuit to form a chain of said multiplexed packets for every communication node of transmission source and for every input transmission path and store resultant chains and;

wherein said read control circuit comprises:

a header analysis circuit coupled to said multiplexing circuit to analyze header portion of received packets supplied to said multiplexing circuit and discriminate communication nodes of transmission source and restart cells, a write address memory for storing a write address to be used in writing the next received packet into said memory of common buffer type upon arrival of said next received packet for every communication node of transmission source and for every input transmission path, a state management memory for managing a packet arrival state for every communication node of transmission source, a read decision circuit for making a decision on reading packets from said memory of common buffer type on the basis of information of said state management memory, a memory read control circuit for successively performing packet read control on the basis of information supplied from said read decision circuit, a read address memory for storing an address of a packet to be read subsequently for every node of transmission source and for every receiving transmission path, and an unoccupied address management memory for storing unoccupied addresses of said memory of common buffer type.

5. A packet communication system including a plurality of communication nodes linked by a transmission path, subscriber terminals being coupled to said communication nodes, information supplied from said subscriber terminals being formed into packets each having a header portion and an information portion, said packets being communicated between said plurality of communication nodes, said communication nodes including at least one transmitting and receiving packet communication apparatus for transmitting and receiving a plurality of transmission packets arranged in a serial form, said transmission path including at least one of physical and logical lines, said at least one packet communication apparatus comprising:

transmitting buffers for storing transmission packets, said transmitting buffers corresponding to respective lines of said transmission path;

write control circuit for managing the order of a plurality of transmission packets supplied from said subscriber terminal of transmitting side for every packet communication apparatus of transmission destination of communication node of transmission destination or for every call of subscriber terminal of transmission source and for exercising control so as to write said plurality of transmission packets into said transmitting buffers in appropriate order;

transmitting control circuits corresponding to said transmitting buffers and transmitting and receiving lines and incoming lines of said transmission path, whereby when an unoccupied packet arrives at one of the incoming lines of said transmission path and transmission packets are already stored in said transmitting buffers, the packets in said transmitting buffers are sent out onto respective transmitting and receiving lines of said transmission path;

receiving control circuits corresponding to respective transmitting and receiving lines of said transmission path, said receiving control circuits monitoring transmission packets sent out onto transmitting and receiving lines and determining the destination of transmission of the transmission packets;

a receiving buffer for temporarily storing packets found by said receiving control circuit to be directed to its own node; and a read control circuit for reading out the received packets stored in said receiving buffer in the same order as the order of writing said received packets into said transmitting buffers based on information included in said header portions of said received packets and outputting said received packets thus read out onto outputting lines of said transmission path;

wherein said at least one packet communication apparatus further comprises a restart cell generation circuit for periodically generating restart cells regulating the order of reading the received packets for every packet communication apparatus of transmission destination of communication node of transmission destination or every call and for sending out said restart cells respectively to said lines; and said read control circuit is so configured as to receive said restart cells transmitted from said transmitting packet communication apparatus, confirm the order of received packets read out from said receiving buffer, and readjust said order of readout.

6. A packet communication system according to claim 5, wherein said restart cell generation circuit comprises a generation circuit for managing the number of transmission packets for every packet communication apparatus of transmission destination of communication node of transmission destination or every call and for generating a restart cell with respect to a node of transmission destination when a predetermined number of packets have been transmitted.

7. In a packet communication system including a plurality of communication nodes linked by a transmission path, subscriber terminals being coupled to said communication nodes, information supplied from said subscriber terminals being formed into packets each having a header portion and an information portion, said packets being communicated between said plurality of communication nodes, a packet communication apparatus comprising:

transmitting packet communication apparatus;

receiving packet communication apparatus;

each of said transmitting and receiving packet communication apparatuses including subscriber terminals for transmitting or receiving a plurality of transmission packets arranged in a serial form;

a plurality of lines including at least m, where m is an integer, of physical and logical lines interconnecting said transmitting and receiving packet communication apparatuses;

m transmitting buffers for storing transmission packets supplied from said transmitting packet communication apparatus, said m transmitting buffers being so disposed as to correspond to said m lines;

l write control circuits, where l is an integer, for performing serial-to-parallel conversion on a plurality of transmission packets of said transmitting packet communication apparatus, managing the order of said transmission packets converted into a parallel form for every transmission destination or for every call from subscriber terminals accommodated in each node and for exercising control so as to write said packets into said transmitting buffers in appropriate order;

m packet multiplexing circuits disposed between said l write control circuits and said n transmitting buffers to multiplex packets supplied from said l write control circuits and supply the multiplexed packets to said m transmitting buffers;

m transmitting control circuits corresponding to said m transmitting buffers, packets of the incoming lines of said transmission path, and the transmitting and receiving lines of said transmission path, whereby when an unoccupied packet arrives at one of said incoming lines and transmission packets are already stored in said transmitting buffers, the packets in said transmitting buffers are sent out onto respective outgoing lines of said transmission path;

m receiving control circuits corresponding to said m lines, said receiving control circuits monitoring transmission packets sent out onto said lines and determining the destination of transmission of the transmission packets;

n, where n is an integer, receiving buffers for temporarily storing packets found by said receiving control circuit to be directed to its own node;

n read control circuits for reading out the received packets stored in said n receiving buffers in the same order as the order of writing said received packets into said transmitting buffers based on information included in said header portions of said received packets; and an asynchronous transfer mode (ATM) switch disposed between said m receiving control circuits and said n receiving buffers, said ATM switch suitably dividing received packets supplied from said m receiving control circuits into n groups every communication node of transmission source and distributing said n groups among said n receiving buffers.

8. A communication method for performing communication between a plurality of communication nodes disposed on a transmission path by sharing said transmission path, said packet communication method comprising the steps of:

distributing in a transmitting section of one of said communication nodes transmission packets among at least one of physical and logical lines installed in said transmission path in appropriate order;

transmitting said transmission packets for each of said lines when transmission becomes possible;

receiving and rearranging packets supplied from transmitting sections of all of said communication nodes into the same order as that of distribution performed in said transmitting section of said one of said communication nodes based on information included in header portions of said received packets;

periodically sending special packets referred to as restart cells from said transmitting section of said one of said communication nodes to all of the physical or logical lines; and performing in receiving section of said one of said communication nodes confirmation of order of received packets and readjustment of the order on the basis of said restart cells.

9. A packet communication apparatus for performing communication by sharing a transmission path, said packet communication apparatus comprising:

m, where m is an integer, transmitting buffers correspond to m physical or logical lines included in said transmission path, transmission packets being kept waiting in said m transmitting buffers;

m transmitting and receiving control circuits connected to said m transmitting buffers to exercise control over transmission of packets to said m physical or logical lines and control over reception of packets from said m physical or logical lines;

l, where l is an integer, write control circuits for managing order of transmission packets for every packet communication apparatus of transmission destination or every call from subscriber terminals accommodated in each node and for exercising control over writing so as to write transmission packets into said m transmitting buffers in appropriate order;

m packet multiplexing circuits corresponding to said m transmitting buffers, packets supplied from said l write control circuits being multiplexed by said l write control circuits;

n, where n is an integer, receiving buffers for temporarily storing received packets;

n read control circuits for reading received packets from said n receiving buffers in the same order as that of writing the packets into said m transmitting buffers performed in the packet communication apparatus of transmission source based on information included in said header portions of said received packets; and an asynchronous transfer mode (ATM) switch disposed between said m transmitting and receiving control circuits and said n receiving buffers, said ATM switch suitably dividing received packets supplied from said m transmitting and receiving control circuits into n groups every communication node of transmission source and distributing said n groups among said n receiving buffers.

10. A packet communication apparatus for performing communication by sharing a transmission path, said packet communication apparatus comprising:

transmitting buffers so disposed as to correspond to at least one of physical and logical lines included in said transmission path, transmission packets being kept waiting in said transmitting buffers;

a transmitting and receiving control circuit connected to said transmitting buffers to exercise control over transmission of packets to said lines and control over reception of packets from said lines;

a write control circuit for managing order of transmission packets for every packet communication apparatus of transmission destination or every cell from subscriber terminals accommodated in each node and for exercising control over writing so as to write transmission packets into said transmitting buffers in appropriate order;

a receiving buffer for temporarily storing received packets supplied from said transmitting and receiving control circuit; and a read control circuit for exercising control to read received packets from said receiving buffer in the same order as that of writing the packets into the transmitting buffers performed in the packet communication apparatus of transmission source based on information included in said header portions of said received packets wherein said packet communication apparatus comprises a restart cell generation circuit for sending out special packets referred to as restart cells to all of the plurality of physical or logical lines at intervals of a fixed or appropriate period every packet communication apparatus of transmission destination or every call or for writing the restart cells into all of the transmitting buffers, and wherein confirmation of order of received packets read out from said receiving buffer and readjustment of the order are performed in said read control circuit on the basis of said restart cells transmitted from a packet communication apparatus of transmission source.

* * * * *